United States Patent [19]

Spanke

[11] Patent Number: 4,787,692
[45] Date of Patent: Nov. 29, 1988

[54] ELECTRO OPTICAL SWITCH ARCHITECTURES

[75] Inventor: Ronald A. Spanke, Wheaton, Ill.

[73] Assignee: American Telephone and Telegraph Company AT&T Bell Laboratories, Murray Hill, N.J.

[21] Appl. No.: 25,331

[22] Filed: Mar. 13, 1987

[51] Int. Cl.⁴ ............................................. G02B 6/28
[52] U.S. Cl. ............................. 350/96.16; 350/96.13; 350/96.14
[58] Field of Search ............... 350/96.11, 96.12, 96.13, 350/96.14, 96.15, 96.16; 250/227; 370/1-4

[56] References Cited

U.S. PATENT DOCUMENTS 4,012,113  3/1977  Kogelnik et al. ............... 350/96

FOREIGN PATENT DOCUMENTS 53-144353 12/1978 Japan .................. 350/96.13
58-95330   6/1983 Japan .................. 350/96.13
60-76722   5/1985 Japan .................. 350/96.14

OTHER PUBLICATIONS

Fujii et al., Electronics and Communications in Japan, vol. 63-C, No. 1, 1980, "Low Loss 4×4 Optical Switching Network," pp. 114–121.
Ogiwara et al., Applied Optics, vol. 17, No. 8, Apr. 15, 1978, "Optical Waveguide Switch (3×3) for an Optical Switching System," pp. 1182–1186.
H. Kogelnik, "Switched Directional Couplers with Alternating $\Delta\beta$", IEEE Journal of Quantum Electronics, vol. QE-12, No. 7, Jul. 1976.
S. K. Sheem, "Single-Mode Fiber-Optical Power Divider: Encapsulated Etching Technique", Optics Letters, vol. 4, No. 1, Jan. 1979, pp. 29–31.
R. C. Alferness, "Characteristics of Ti-Diffused Lithium Niobate Optical Directional Couplers", Applied Optics, vol. 18, No. 23, Dec. 1, 1979, pp. 4012–4016.
M. Kondo, "Integrated Optical Switch Matrix for Single-Mode Fiber Networks", IEEE Journal of Quantum Electronics, vol. QE-18, No. 10, Oct. 1982, pp. 1759–1765.
E. E. Bergmann, "Coupling of Intersecting Ti:LiNbO₃ Diffused Waveguides", Applied Optics, vol. 23, No. 17, Sep. 1, 1984, pp. 3000–3003.
H. S. Hinton, "A Nonblocking Optical Interconnecting Network Using Directional Couplers", IEEE Global Telecommunications Conference, Atlanta, Ga., Nov. 26–29, 1984, pp. 885–889.
J. E. Watson, "Polarization-Independent 1×16 Optical Switch using TiLiNbO₃ Waveguides", Proc. OFC/OFS '85, paper WK-4.
M. Kondo, "32 Switch-Elements Integrated Low-Crosstalk LiNbO₃ 4×4 Optical Matrix Switch", IOOC-ECOC-85, pp. 361-364, 1985.

Primary Examiner—William L. Sikes
Assistant Examiner—Frank González
Attorney, Agent, or Firm—Kenneth H. Samples

[57] ABSTRACT

Optical switch networks and the design rules for creating them are disclosed. The networks comprise a plurality of input and output stages of optical switch elements. Each input optical switch stage is comprised of a plurality of 1 by 2 optical switch elements and each output stage is comprised of a plurality of 2 by 1 optical switch elements. Using these stages, optical switch networks are constructed where switch elements are interconnected by optical waveguides diffused in a substrate. Further, the connections between adjacent stages include optical waveguide crossovers (crossthroughs).

9 Claims, 6 Drawing Sheets

ELECTRO OPTICAL SWITCH ARCHITECTURES

TECHNICAL FIELD

The invention relates to electro optical switch architectures and, more particularly, to practical architectures for the fabrication of switch structures having multiple input ports and multiple output ports.

BACKGROUND OF THE INVENTION

Optical switching offers many significant advantages over known electronic switching techniques. Among these advantages are the greatly increased bandwidth and rapid switch reconfiguration rates. Also, with the increased use of photonics as a transmission method, the elimination of optical/electronic conversion when a switch is encountered, is a desirable result. One known optical switch architecture is constructed of a plurality of 1 to N active signal splitters interconnected with a plurality of N to 1 active signal combiners. Electrical signals are used to control to which output of a signal splitter an optical input signal is sent, and, similarly, electrical signals control which optical input of a signal combiner is connected to the one output. With this known architecture, an N-by-N switch array comprises N signal splitters (one for each input) and N signal combiners (one for each output). The splitters and combiners are then interconnected so that each output of each splitter is connected as an input to each of the combiners. This switch architecture exhibits acceptable signal to noise and attenuation characteristics. However, N×N connections must be made between the splitters and combiners. When the switch has a large number of inputs and outputs, the number of connections may become unwieldy. For example, to construct a 32-by-32 network, 1,034 splitter/combiner connections must be made. If optical fibers are used as the interconnection media, the physical size of the number interconnection paths reduces the desirability of the arrangement. Additionally, the connection of optical fibers to the splitters and combiners adds signal attenuation. The physical size of the interconnection may be reduced by placing all splitters and combiners on a single substrate and by fabricating crossing light guides between the splitters and combiners in the substrate. This would require 246,016 crossovers (crossthroughs) of light guides for a 32-by-32 switch. Since each crossover decreases the signal to noise ratio and increases the attenuation, such crossovers would severely limit the device's usefulness. Thus, problems exist in fabricating networks of optical switch elements such that the resulting network has good signal transmission characteristics.

SUMMARY OF THE INVENTION

The foregoing problems are solved and a technical advance is achieved in accordance with the principles of my invention. My invention consists of an optical switch network having a layout and interconnection of 1 by 2 and 2 by 1 switch elements to achieve a nonblocking network having good signal to noise characteristics without the crossover (cross-through) limitations of the prior art. The optical network consists of an input section of stages from N network input ports to the widest stage (called the center) of the network and an output section from the center to M outputs ports. The input stages are comprised of 1 by 2 optical switch elements and the output stages are comprised of 2 by 1 optical switch elements. Advantageously, the interconnection of the stages of the input and output sections include optical crossovers (cross-throughs) diffused in the same substrate in which the switch elements are formed. By placing the optical waveguide crossovers away from the center of the network, a reduction in the total number of crossovers is achieved, thereby improving the signal transmission characteristics of the optical switch network.

BRIEF DESCRIPTION OF THE DRAWING

A more complete understanding of the present invention may be obtained from consideration of the following description when read in conjunction with the drawing in which.

DETAILED DESCRIPTION

Figure 1:
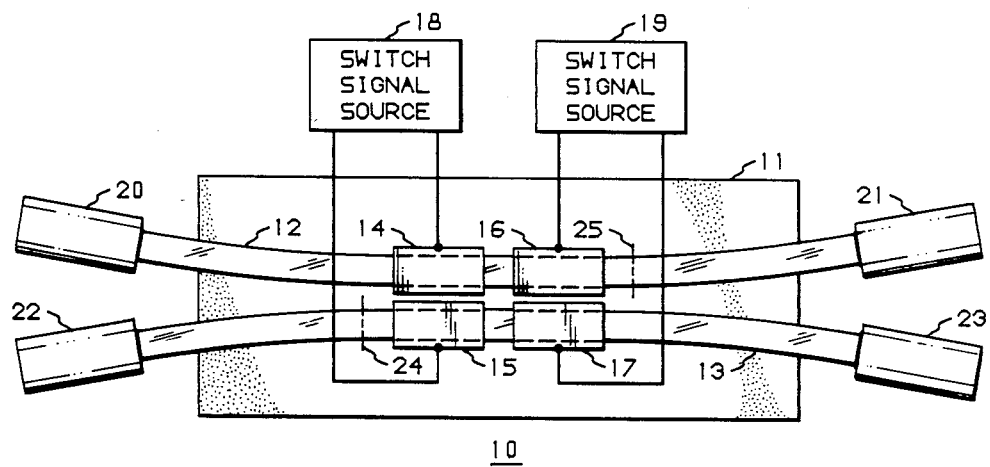
FIG. 1 is a diagram of a 2 by 2 optical switch element.

FIG. 1 is a diagram of a known electro optical switch device which can be used in the embodiment of the present invention. Device 10 comprises a lithium niobate substrate 11 into which two optical strip titanium waveguides 12 and 13 have been diffused. Waveguides 12 and 13 have a section in which they are parallel and close enough to one another to allow evanescent field coupling to take place. Electrodes 14 through 17 are disposed over the waveguides in the section where they are parallel. Switch signal source 18 is connected to apply voltage between electrodes 14 and 15 and a switch signal source 19 is connected to apply voltage between electrodes 16 and 17. Waveguide 12 is optically connected to an optical signal source 20, and an optical receiver 21 and waveguide 13 is connected to an optical source 22 and an optical receiver 23. Sources 20, 22 can be, for example, lasers. As is well known in the art, optical signals from either of the light sources 20 or 22 can be switched to either of the receivers 21 or 23 by appropriately controlling the voltages applied between electrodes 14 and 15 and electrodes 16 and 17. Such a device and its control is described in detail in Kogennik et al. U.S. Pat. No. 4,012,113. The device of FIG. 1 is referred to as a 2-by-2 switch since it comprises two input ports and two output ports. This 2-by-2 switch can be made into a switch having one input and two outputs (1-by-2) by simply not connecting source 22 or by terminating waveguide 13 at the line denoted 24. Similarly, terminating waveguide 12 at the line denoted 25 would result in a switch having two inputs and one output (2-by-1). In the course of the present discussion, reference is made to input ports and output ports of both individual switch elements and optical switch networks. This is done merely to differentiate one side of a switch structure from the other. Either side of the switch structures described can comprise input ports or output ports depending on which side optical transmitters are connected and which side optical receivers are connected. The above is described to ease the understanding of the present invention which can be constructed from such devices. The particular device actually used to control the optical switching is not important to the present invention.

Figure 2:
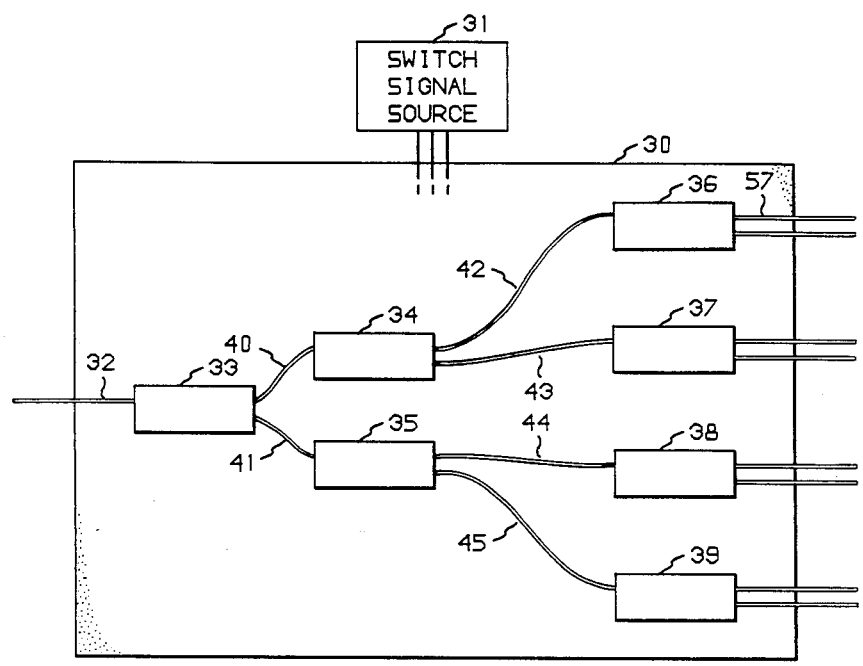
FIG. 2 is a diagram of a 1 by 8 switch network.

FIG. 2 represents a 1-by-8 optical switch comprising a plurality of 1-by-2 optical switch elements 33 through 39. Each of the switch elements, 33 through 39 comprises one of the switch elements 10 connected to operate as an 1-by-2 switch. FIG. 2 includes a substrate 30 into which an input waveguide 32 has been diffused. Input waveguide 32 is connected as an input to 1-by-2 optical switch element 33. The two outputs of optical switch element 33 are separately connected to the input ports of 1-by-2 switch elements 34 and 35 by diffused optical waveguides 40 and 41, respectively. The two outputs of -1-by-2 switch element 34 are connected to the input of optical switch elements 36 and 37 by optical waveguides 42 and 43, and the two outputs of optical switch element 35 are connected as inputs to the 1-by-2 optical switch elements 38 and 39 by waveguides 44 and 45. Eight optical output ports are created by connecting the output ports of 1-by-2 switches 36 through 39 to the edge of the substrate with optical waveguides. FIG. 2 also includes a switch signal source 31 which provides electrical signals to control optical switch 30. Switch signal source 31 is connected (not shown) to the switch elements 33 through 39 in a manner similar to the electrical connections shown in FIG. 1. By properly supplying electrical signals to the 1-by-2 switches 33 through 39, light entering the input waveguide 32 can be switched to any of the eight output ports.

Figure 3:
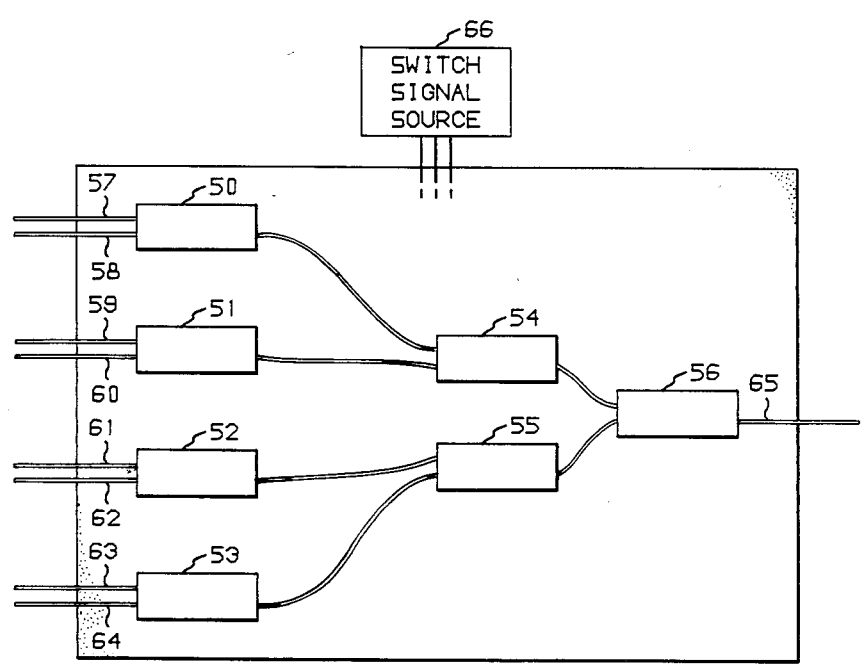
FIG. 3 is a diagram of an 8 by 1 switch network.

FIG. 3 is a diagram of an 8-by-1 switch device constructed from 2-by-1 switch elements 50 through 56. The structure is not described in detail since it is merely the mirror image of the connections of FIG. 2 and is controlled by switch signal source 66 to switch optical signals at any of its eight input ports 57 through 64 to its single output port 65.

Figure 4:
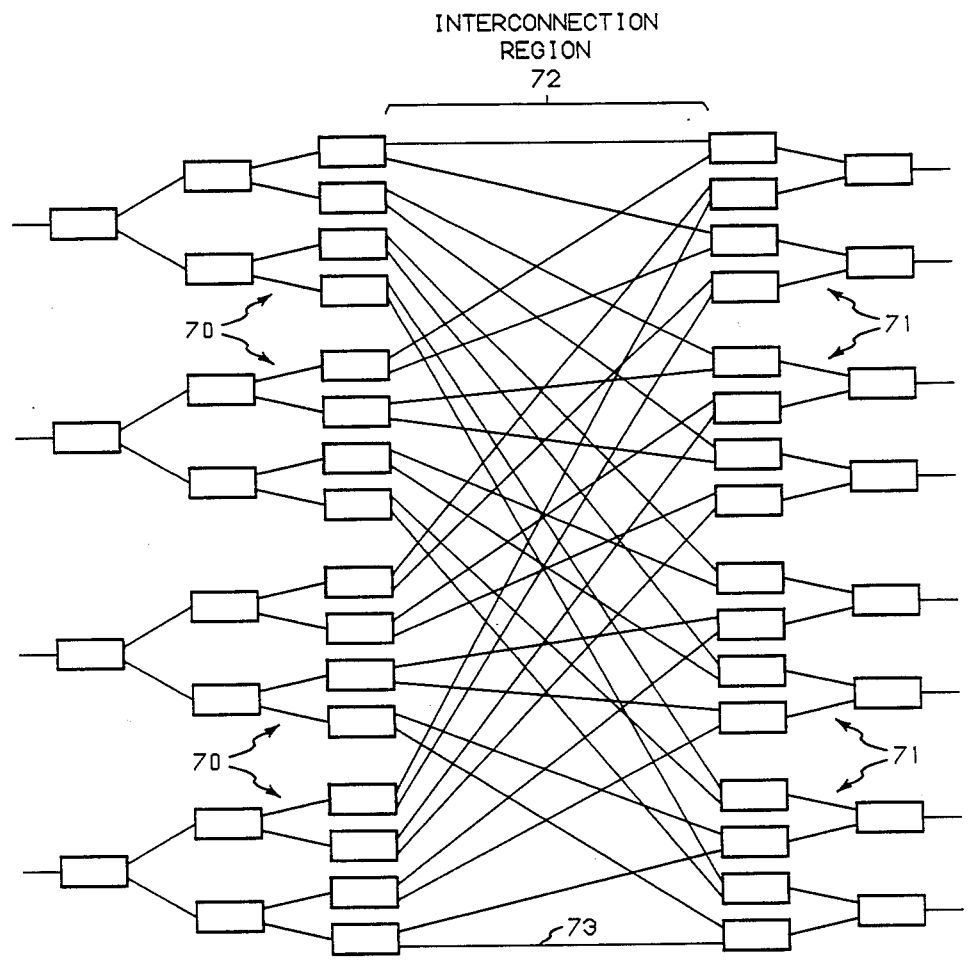
FIGS. 4, 5 and 6 show structures for achieving 4 by 8 optical switch networks.

FIG. 4 represents a 4-by-8 - optical switch. This switch comprises four 1-by-8 electrically controlled optical splitters 70 of the type discussed with regard to FIG. 2 and eight 4-by-1 electrically controlled optical combiners 71. Neither the source of electrical control signals nor their connections to the individual switch elements is shown for ease of understanding. The optical splitters 70 and combiners 71 are connected by plurality of optical connections, e.g. 73 in an interconnection region 72. As can be seen in FIG. 4, region 72 includes a large number of connections, and due to the pattern of interconnection the use of optical fibers in region 72 would result in a large connecting bundle. Techniques for fabricating diffused waveguide optical crossovers (crossthroughs) in a substrate are known in the art and are described, for example, in "Coupling of Intersecting Ti-LiNbO3 Diffused Waveguides", E. E. Bergmann, L. McCaughan and J. E. Watson, *Applied Optics*, Vol. 23, No. 17, Sept. 1, 1984. In order to avoid losses in connections between the optical splitters/combiners and optical fibers and to reduce the large size of the bundle of fibers, it has been proposed to fabricate the entire 4-by-8 switch network on a single substrate, using diffused waveguides including waveguide crossovers as the interconnections, e.g. 73 in region 72. Using diffused waveguide crossovers in region 72 results in 168 total optical crossovers. Further, the path having the most crossovers (the worst case path) includes 21 such crossovers. The signal transmission characteristics of such a device would be limited due to the decrease in signal to noise ratio and added attenuation of the large number of waveguide crossovers in region 72.

Figure 5:
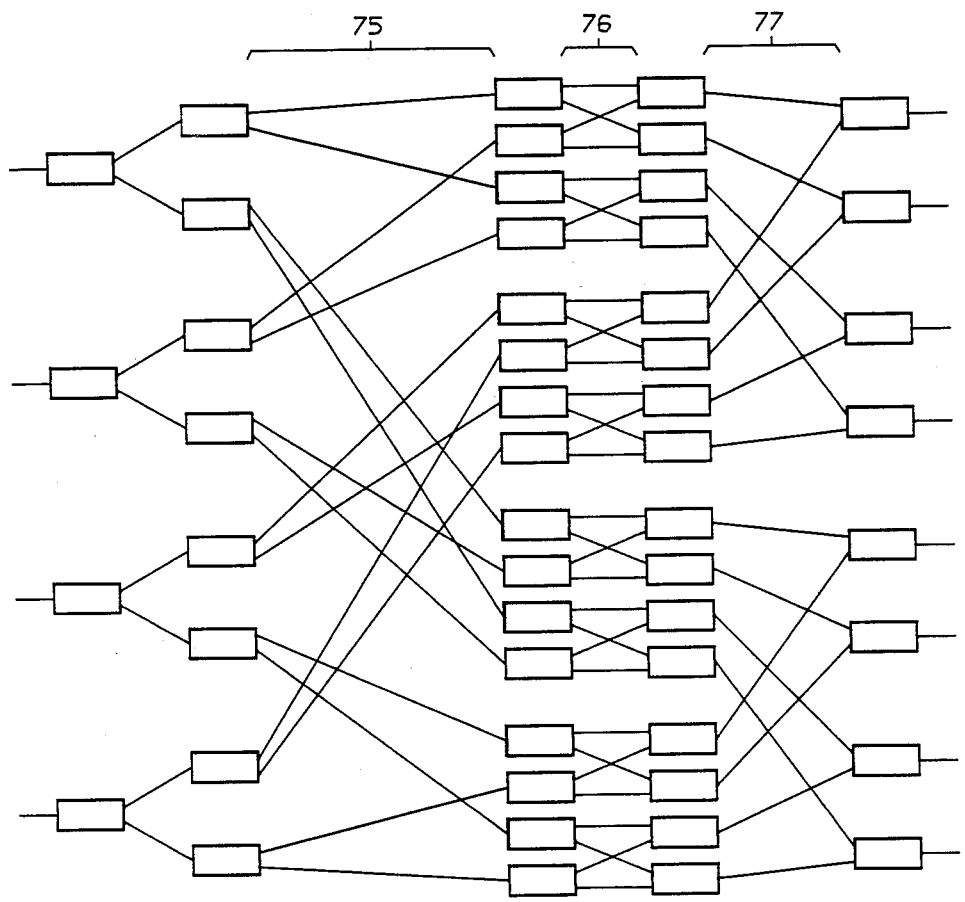

FIG. 5 is a diagram of a 4-by-8 optical switch embodying the present invention. This 4-by-8 optical switch is fabricated on a single substrate and employs diffused optical waveguide crossovers in three regions 75, 76, and 77. As a result, the total number of crossovers is reduced from 168 to 48 and the number of crossovers in the worst case path is reduced from 21 to 11. This results in substantial improvements in signal transmission characteristics and reduces the complexity of the pattern of interconnections in region 72.

Figure 6:
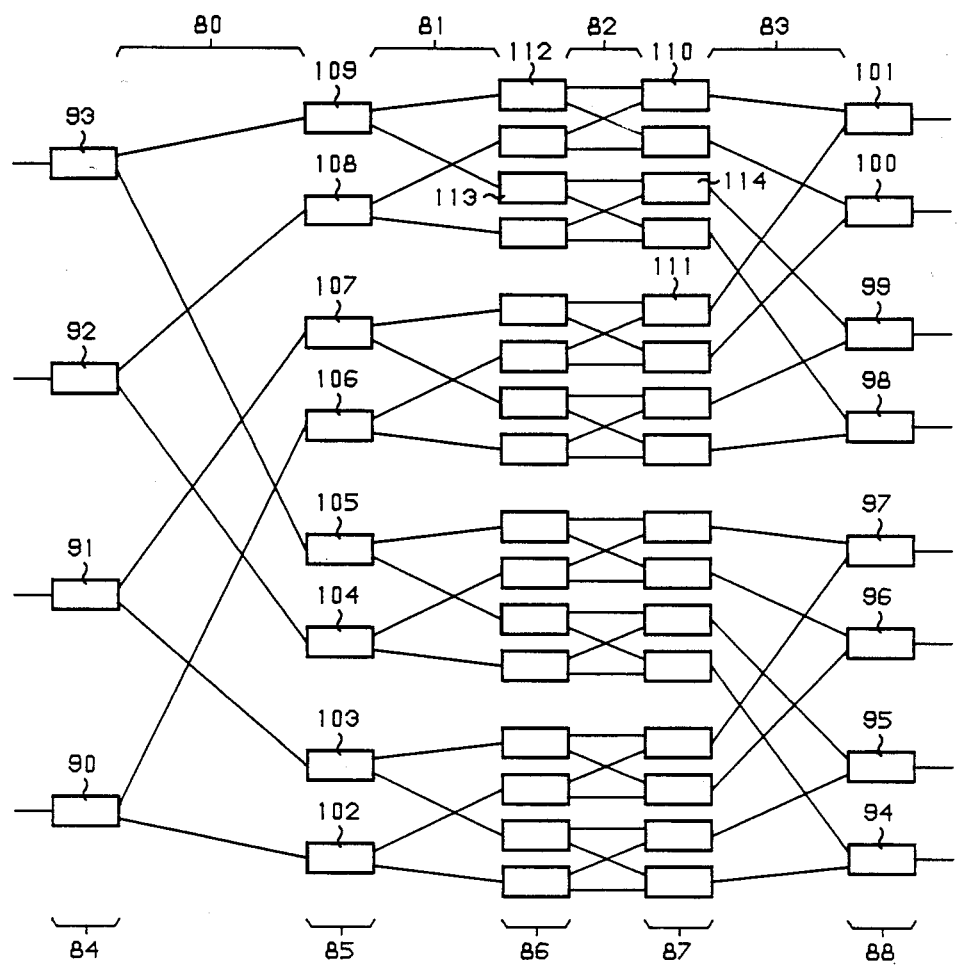

FIG. 6 represents another 4-by-8 switch network embodying the present invention. The switch of FIG. 6 also is fabricated using a single substrate including optical crossovers in four regions 80 through 83. With the arrangement of FIG. 6, the total number of crossovers is reduced from 168 to 30 and the number of crossovers in the worst case path is reduced from 21 to 8 over the arrangement of FIG. 4. This arrangement offers significant transmission improvements over the arrangements in both FIGS. 4 and 5.

The pattern of connections between switching elements is carefully selected to limit the number of optical crossovers and retain the nonblocking characteristics in an optical switch network constructed in accordance with the present invention. The following discussion relates generally to an N-by-M optical switch and includes specific examples relating to the embodiment of FIG. 6 where $N=4$ and $M=8$. Throughout the present discussion and the attached claims, all the logarithms are logarithms to the base 2. Initially, the number of switching stages in an N-by-M network must be determined. The total number of stages is log N plus log M. Thus, the total number of stages for a 4-by-8 switch is log 4 plus log $8=2+3=5$. The switch network is considered to have an input side and output side which are separated by region 82 between two stages having the same number $N \times M/2$ of switch elements. This region 82 is referred to as the center region although it may not actually be in the physical center of the network. It should be remembered that the terms input and output are used herein only to distinguish the two sides of the network. As noted earlier, either side of the network can be an optical input or an optical output. The input stage 84 includes N 1-by-2 optical switch elements and the output stage 88 includes M 2-by-1 optical switch elements. In FIG. 6 the input stage includes four 1-by-2 switches 90 through 93 and the output stage includes eight 2-by-1 switches 94 through 101. Preceding from the input(output) toward the center region 82, each stage has two times the number of switch elements as the preceding stage. Accordingly, seond stage 85 includes $N \times 2 = 8$ 1-by-2 switches 102 through 109 and the third stage 86 includes 16 1-by-2 switches, e.g. 112 and 113. Similarly, the first stage 87 toward the center from output stage 88 includes $2 \times M = 16$ switch elements. Once the number of stages and the number of switching elements per stage has been calculated, the pattern of connections between these stages must be determined.

In order to lay out the proper pattern of connections, the elements of each stage are divided into one or more groups depending on the distance of that stage from the "center" region, e.g. 82. Each group is then connected to an adjacent associated group which is closer to the center region. Within each pair of associated groups to be connected, the switch elements of the outermost group are connected to the associated group such that each outer switch element is connected to the switch element having the same rank within the associated group and to the switch element which is one-half of the number of elements in the associated group from the first connection. The group size for a given connection between stages is $1/2^i$ times the number of switch elements in each stage where i is the number of prior regions for which patterns of interconnection have been determined. Patterns are first determined for the switch stage which is the farthest from the center region, since this is the first region for which a connection pattern is to be determined no prior region has had a pattern determined and i=0. Thus, the group size for the first region is $1/2^0=1$ of the switch elements in the stage, which is the entire stage. Accordingly, in FIG. 6, the first switch element 93 of stage 84 (the outermost stage) is connected to the first (the same rank) switch element 109 of stage 85. Switch element 93 is also connected to switch element 105 which is one-half of the number of elements in stage 85 (the group) farther into the stage than switch element 109. Similarly, the second switch element 92 in stage 84 is connected to the second switch element 108 of stage 85 and to the sixth switch element 104. This pattern of connection continues until all outputs of stage 84 are connected as inputs to switch elements in stage 85.

The next stage to have connection patterns determined for it is the stage which is the farthest from the center region 82 of the network for which no pattern of connections has been determined. In the present example, both input side stage 85 and output side stage 88 are the same distance from region 82. Either side could be selected for determination of connections. However, interconnection pattern complexity is more uniformly distributed when alternate sides of the switch network are connected. Accordingly, a pattern of connection is next determined for region 83. Since one prior region (80) has had a pattern of conneciions determined for it, i=1, now and the group size for this region is $1/2^1=\frac{1}{2}$ of the number of switch elements of the stages on either side of the region. Accordingly, a first group of four output switch elements 98 through 101 is to be connected to a group of eight switch elements in stage 87 and a second group of four switch elements 94 through 97 is to be connected to the eight remaining switch elements in stage 87. The pattern of connections is the same as before, within the groups. That is, each switch element, e.g. 101 in stage 88 is connected to a switch element 110 of the same rank in stage 87, and element 111 which is four (one-half of the number of elements in the group) farther down the stage.

After connections have been determined for region 83, region 81 is the farthest region from region 82 for which no connections have been determined. For this region, the group size is one-fourth of the switch elements in stages 85 and 86 since two prior regions have had connection patterns determined $1/2^2=\frac{1}{4}$. Thus, a group consists of 2 switch elements in stage 85 and 4 switch elements in stage 86. Similar to before, each switch element of stage 85, e.g. 109 is connected to a switch element 112 of stage 86 having the same rank within the group and to a switch element 113 of the group which is one-half the number of switch elements in the group farther into the group. When further equal sized stages that are the same distance from the center region 82 are encountered, but not including the two adjacent stages on either side of the center region 82, the program of alternating sides and connecting continues with each connection occurring between groups which are $1/2^i$ of the number of elements in the stage. When the input side of the network is to be connected to the output side, e.g., center region 82, there will always be two equal stages, e.g., 86 and 87 of 1-by-2 switch elements on the input side and 2-by-1 switch elements on the output side. Also, the group size will always have the dimension of two. Each switch element, e.g., 112 in a given group on each side of region 82 is connected to both switch elements 110 and 114 of the group on the other side. This completes the determination of the pattern of connections between the stages of switch elements. After the pattern is determined, a device can be fabricated by appropriately placing the optical switch elements required and by diffusing waveguides to give the appropriate connection pattern between the switch elements, which waveguides will include optical crossovers.

Figure 7:
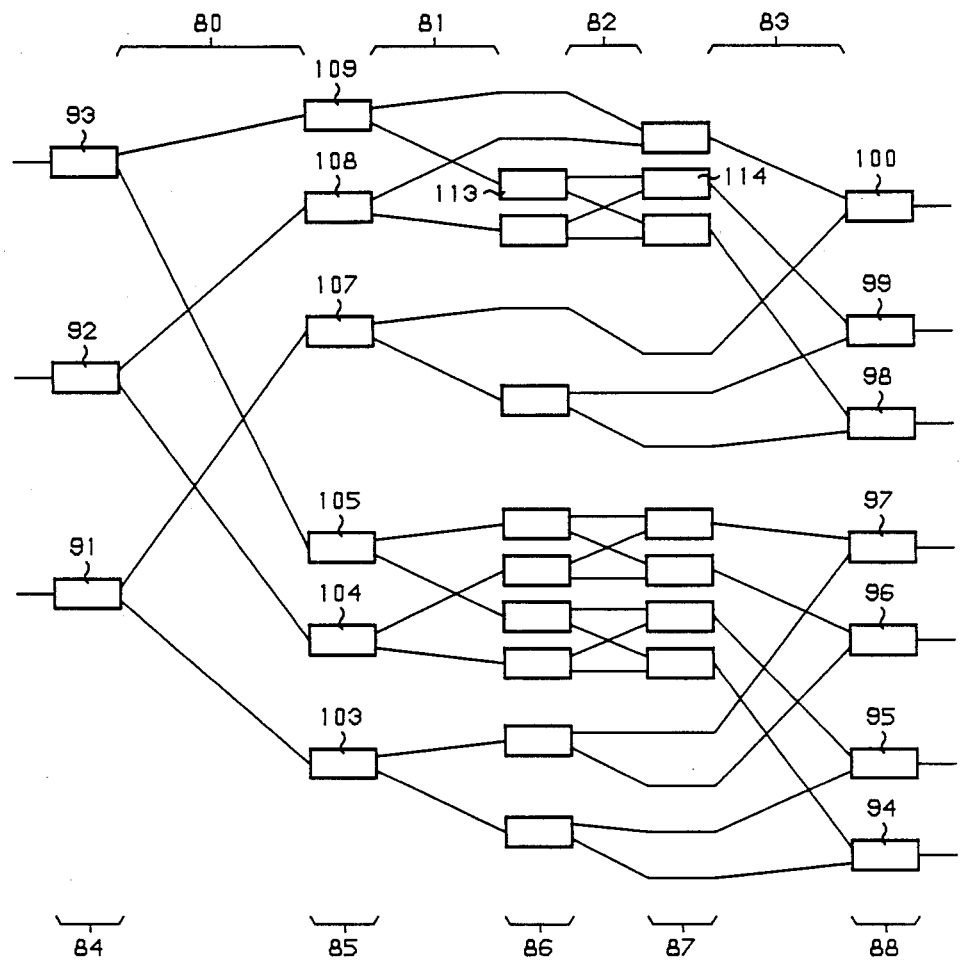
FIG. 7 shows a structure for a 3 by 7 optical switch network.

The preceding description relied on both the number of input ports and output ports being powers of 2. The present invention can also be used in the fabrication of switch networks in which the number of input ports and output ports are not powers of 2. The following is a description of the construction of a 3 by 7 switching network in accordance with the principles of the present invention. When the number of input ports and/or output ports is not equal to a power of 2, the number is raised to the next higher power of 2. In the present example a 3 by 7 network becomes a 4 by 8 network for this step of fabrication. Next, the arrangement of switch elements and their interconnection pattern is determined as described above when both N+M were powers of two. This results in a network as shown and described, with regard to FIG. 6. After the pattern has been determined, input and output switch elements are selectively removed down to the number actually needed. It should be noted that the switch elements to be removed are the ones interconnected using the largest number of optical crossovers. With a network laid out as above described, the switch elements farthest from the middle of the input and output stages should be removed. When an input switch element, e.g. 90 is removed, all switch elements feeding from that switch element 90 and their interconnecting waveguides are removed from the pattern. In the present embodiment, this results in the removal of switch elements 90, 102, 106 and the four switch elements of stage 86 fed by them. When an output switch element, e.g. 101 is removed, all the switch elements that feed into that output switch element and all of the associated waveguides should be removed from the pattern. In the present example, this results in the removal of switch elements 101, 110 and 111 and their interconnection waveguides. When these switch elements have been removed, certain switch elements, e.g. 112 have only one input and one output. Advantageously, these switch elements, e.g. 112 can be replaced with an optical waveguide connecting the single input and the single output. After the removal of switch elements and connection paths, the pattern of FIG. 7 remains. A network having the pattern of FIG. 7 can then be fabricated to provide a 3 by 7 switch network.

In the preceding discussion, the switching networks were described as being laid out on a single substrate. It would be possible to fabricate switching networks on multiple substrates and still gain the advantages of applicant's invention by fabricating crossing optical waveguides in the early stages of a switching network and thereby reducing the total number of path crossovers in the entire network. Also, the above description relates to optical switch elements which are actively controllable using electrical signals. The present invention, however, is not limited to such active type switch elements. For example, some of the switch elements in the prior example could be replaced with passive signal splitters or combiners without departing from the spirit and scope of the invention.

What is claimed is:

1. An optical switching network having N input ports and M output ports where M and N are non-zero powers of 2 comprising:
    a number of switch stages equal to log M plus log N where each stage is assigned a number from 1 to log M plus log N in sequence from the input ports to the output ports;
    where the stage numbered log M comprises M×N/2 optical 1 by 2 switch elements and each stage between the stage log M and the input ports comprises one-half of the number of 1 by 2 optical switch elements in the next nearer stage to the stage log M and where the stage numbered (log M)+1 comprises M×N/2 optical 2 by 1 switch elements and each stage between stage (log M)+1 and the output ports comprises one-half of the number of 2 by 1 optical switch elements in the next nearer stage to the stage (log M)+1;
    interconnection means for interconnecting the M×N outputs of stage log M to the M×N inputs of stage (log M)+1;
    input interconnection means for connecting the outputs and inputs of adjacent stages of the stages numbered 1 through log M;
    output interconnection means for connecting the outputs and inputs of adjacent stages of the stages numbered (log M)+1 through log M plus log N;
    wherein the connections between at least one of the stages connected by said input and said output interconnection means comprise optical crossovers of optical waveguides diffused in a substrate.

2. An optical switching network having N input ports and M output ports wherein M and N are non-zero powers of 2 comprising:
    a number of switch stages equal to log M plus log N where each stage is assigned a number from 1 to log M plus log N in sequence from the input ports to the output ports;
    where stage numbered log M comprises M×N/2 optical 1 by 2 switch elements and each stage between the stage log M and the input ports comprises one-half of the number of 1 by 2 optical switch elements in the next nearer stage to the stage log M, and where the stage numbered (log M)+1 comprises M×N/2 optical 2 by 1 switch elements and each stage between stage (log M)+1 and said output ports comprises one-half of the number of 2 by 1 optical switch elements in the next nearer stage to the stage (log M)+1 and wherein each optical switch element in stage log M and stage (log M)+1 is assigned a number in sequence from 1 through M×N/2,
    first interconnection means connecting stage log M and stage (log M)+1 such that each odd numbered switch element in stage log M is connected to a switch element having the same number and the same number +1 in stage (log M)+1 and each even numbered switch element in stage log M is connected to a switch element having the same number and the same number −1 in stage (log M)+1; and
    second interconnection means, including optical crossovers, for connecting the switch elements in adjacent ones of the remaining stages.

3. The optical switching network of claim 2 where the number of output ports M is greater than or equal to 4 and wherein stage (log M)−1 comprises M×N/8 groups of two adjacent switch elements and stage log M comprises M×N/8 groups of four adjacent switch elements and where each group of switch elements in stage log M and stage (log M)−1 is assigned a number in sequence from 1 to M×N/8 and said second interconnection means comprises third interconnection means including optical crossovers for interconnecting stage (log M)−1 and stage log M such that the first switch element in each group of switch elements in stage (log M)−1 is connected to the first and third switch elements of the same numbered group of stage log M and the second switch element of each group of switch elements in stage (log M)−1 is connected to the second and the fourth switch elements of the same numbered group in stage log M.

4. The optical switching network of claim 3 where the number of input ports N is greater than or equal to 4 and wherein stage (log M)+1 comprises M×N/16 groups of eight switch elements and the stage (log M)+2 comprises M×N/16 groups of four switch elements and wherein each group of switch elements in stages (log M)+1 and (log M)+2 is assigned a number in sequence from 1 to M×N/16; and
    said second interconnection means further comprises fourth interconnection means including optical crossovers for interconnecting stage (log M)+1 and stage (log M)+2 such that the first switch element of each 9roup of switch elements in stage (log M)+2 is connected to the first and the fifth switch element of the same numbered group in stage (log M)+1, the second switch element of each group of switch elements in stage (log M)+2 is connected to the second and the sixth switch element of the same numbered group in stage (log M)+1, the third switch element of each group of switch elements in stage (log M)+2 is connected to the third and the seventh switch element of the same numbered group of switch elements in stage (log M)+1 and the fourth switch element of each group of switch elements in stage (log M)+2 is connected to the fourth and the eighth switch element of the same numbered-group of switch elements in stage (log M)+1.

5. The optical switching network of claim 2 where the number of input ports N is greater than or equal to 4 and wherein stage (log M)+2 comprises M×N/8 groups of two adjacent switch elements and stage (log M)+1 comprises M×N/8 groups of four adjacent switch elements and where each group of switch elements in stage (log M)+1 and stage log M)+2 is assigned a number in sequence from 1 to M×N/8 and said second interconnection means comprises third interconnection means including optical crossovers for interconnecting stage (log M)+2 and stage (log M)+1 such that the first switch element in each group of switch elements in stage (log M)+2 is connected to the first and third switch element of the same numbered group of stage (log M)+1 and the second switch element of each group of switch elements in stage (log M)+2 is connected to the second and the fourth switch element of the same numbered group in stage (log M)+1.

6. The optical switching network of claim 5 where the number of output ports M is greater than or equal to 4 and wherein stage log M comprises M×N/16 groups of eight switch elements and the stage (log M)−1 comprises M×N/16 groups of four switch elements and wherein each group of switch elements in stages log M and (log M)−1 is assigned a number in sequence from 1 to M×N/16 and said second interconnection means further comprises fourth interconnection means including optical crossovers for interconnecting stage log M and stage (log M)−1 such that the first switch element of each group of switch elements in stage (log M)−1 is connected to the first and the fifth switch element of the same numbered group in stage log M, the second switch element of each group of switch elements in stage (log M)−1 is connected to the second and the sixth switch element of the same numbered group in stage log M, the third switch element of each group of switch elements in stage (log M)−1 is connected to the third and the seventh switch element of the same numbered group of switch elements in stage log M and the fourth switch element of each group of switch elements in stage (log M)−1 is connected to the fourth and the eighth switch element of the same numbered group of switch elements in stage log M.

7. The method of designing an optical switching network having N input ports and M output ports where M and N are non-zero powers of 2 and where N≦M comprising:

defining a number of switch stages equal to log M plus log N where each stage is assigned a number from 1 to log M plus log N in sequence from the input ports to the output ports, adjacent ones of said stages being separated by regions, and stage log M and (log M)+1 being separated by a center region;

defining a number of optical switch elements for each of the stages, where the stage numbered log M comprises M×N/2 optical 1 by 2 switch elements and each stage between the stage log M and the input ports comprises one-half of the number of 1 by 2 optical switch elements in the next nearer stage to the stage log M and where the stage (log M)+1 comprises M×N/2 optical 2 by 1 switch elements and each stage between stage (log M)+1 and the output ports comprises one-half of the number of 2 by 1 optical switch elements in the next nearer stage to the stage (log M)+1;

defining a sequence of regions comprising a first region adjacent to the stage having the smallest number of switch elements and continuing toward the center region for (log M)−(log N) regions and then alternating between the farthest output region from the center region not yet in the sequence and the fathest input region from the center region not yet in the sequence until all regions except the center region have been placed in the sequence;

defining a pattern of connections for each region in the defined sequence by selecting the regions in the defined sequence, dividing the stages on each side of the selected region into groups of switch elements wherein the number of groups in each stage is given by $1/2^i$ times the number of switch elements in the stage, where i is the number of prior regions for which a pattern of connection has been determined, and where each group in a stage corresponds to a group in an adjacent stage and each switch element has a unique position within the group; and determining a pattern of connections between the switch elements of the two stages separated by the selected region such that each switch element having a given position in a given group in the stage farther from the center region is connected to a switch element having the same group position in the corresponding group of the adjacent stage nearer to the center region and to a switch element in the corresponding group having a position equal to the given position plus one-half of the number of switch elements in the corresponding group;

determining a pattern of connections between the switch elements of adjacent stages separated by the center region after all other regions have had a pattern of connections determined.

8. The method of designing an optical switching network having X input ports and Y output ports where X≦Y comprising:

increasing X to a number N, when X is not a power of 2, N being the next highest power of 2 to X;

increasing Y to a number M, when Y is not a power of 2, M being the next highest power of 2 to Y;

defining a number of switch stages equal to log M plus log N where each stage is assigned a number from 1 to log M plus log N in sequence from the input ports to the output ports, adjacent ones of said stages being separated by regions, and stage log M and (log M)+1 being separated by a center region;

defining a number of optical switch elements for each of the stages, where the stage numbered log M comprises M×N/2 optical 1 by 2 switch elements and each stage between the stage log M and the input ports comprises one-half of the number of 1 by 2 optical switch elements in the next nearer stage to the stage log M and where the stage (log M)+1 comprises M×N/2 optical 2 by 1 switch elements and each stage between stage (log M)+1 and the output ports comprises one-half of the number of 2 by 1 optical switch elements in the next nearer stage to the stage (log M)+1;

defining a sequence of regions comprising a first region adjacent to the stage having the smallest number of switch elements and continuing toward the center region for (log M)−(log N) regions and then alternating between the farthest output region from the center region not yet in the sequence and the farthest input region from the center region not yet in the sequence until all regions except the center region have been placed in the sequence;

defining a pattern of connections for each region in the defined sequence by selecting the regions in the defined sequence, dividing the stages on each side of the selected region into groups of switch elements wherein the number of groups in each stage is given by $1/2^i$ times the number of switch elements in the stage, where i is the number of prior regions for which a pattern of connection has been determined, and where each group in a stage corresponds to a group in an adjacent stage and each switch element has a unique position with the group; and determining a pattern of connections between the switch elements of the two stages separated by the selected region such that each switch element having a given position in a given group in the stage farther from the center region is connected to a switch element having the same group position in the corresponding group of the adjacent stage nearer to the center stage and to a switch element in the corresponding group having a position equal to the given position plus one-half of the number of switch elements in the corresponding group;

determining a pattern of connections between the switch elements of the adjacent stages separated by the center region after all other regions have had a pattern of connections determined;

deleting $N-X$ switch elements in stage number 1 and deleting each switch element in stages numbered 2 through log M which is connected to receive signals from the deleted switch elements in stage 1; and deleting $M-Y$ switch elements in stage (log M)+(log N) and deleting each switch element in stages (log M)+1 to (log M)+(log N)−1 which is connected to provide signals to the switch elements deleted from stage (log M)+(log N).

9. The method of designing of claim 8 further comprising the step of replacing each switch element having only one input connection and one output connection with a waveguide between that input connection and that output connection.

* * * * *